United States Patent [19]

Ferrer et al.

[11] Patent Number: 4,479,196
[45] Date of Patent: Oct. 23, 1984

[54] HYPEREDGE ENTITY-RELATIONSHIP DATA BASE SYSTEMS

[75] Inventors: Richard S. Ferrer, Belle Mead; Alan J. Goldstein, Livingston; Zaher A. Nazif, High Bridge, all of N.J.

[73] Assignee: AT&T Bell Laboratories, Murray Hill, N.J.

[21] Appl. No.: 441,730

[22] Filed: Nov. 15, 1982

[51] Int. Cl.³ .............................................. G06F 15/40
[52] U.S. Cl. ..................................................... 364/900
[58] Field of Search ... 364/200 MS File, 900 MS File

[56] References Cited

U.S. PATENT DOCUMENTS 4,128,891  12/1978  Lin et al. ............................. 364/900
4,221,003  9/1980   Chang et al. ........................ 364/900
4,283,771  8/1981   Chang .................................. 364/900

OTHER PUBLICATIONS

Cattell, G. G., "An Entity-Based Database User Interface", *Proc. ACM-SIGMOD.*, May 14–16, 1980, pp. 144–150.
"Graphs and Hypergraphs", North Holland Company, 1973, pp. 389–413.
Chen, P., "The Entity-Relationship—Toward a Unified View of Data", *ACM Trans. on Database Systems*, Mar. 1976, pp. 9–36.

*Primary Examiner*—Raulfe B. Zache
*Attorney, Agent, or Firm*—R. O. Nimtz

[57] ABSTRACT

A data base management system is disclosed in which data entities are records representing nodes in an entity-relationship directed graph. The body of each node represents one of the physical entities to be utilized while the edges of each node represent relationships between that physical entity and other physical entities. Some of the edges are hyperedges to permit the identification of simultaneous relationships with more than one other node. An application of this system to the assignment of telephone outside plant equipment to telephone subscribers is also described.

10 Claims, 10 Drawing Figures

```
           RECORD NODE 10

(a)  BODY
     1) ENTITY TYPE
     2) ENTITY I D
     3) ADJACENT LOCK NODES
     4) APPLICATION DATA (b)  EDGE
     1) ENTITY TYPE 1
     2) ENTITY I D 1
     3) APPLICATION DATA (c)  EDGE
     1) ENTITY TYPE 1
     2) ENTITY ID1
     3) APPLICATION DATA (d)  EDGE
     1) ENTITY TYPE 1
     2) ENTITY ID1
     3) ENTITY TYPE 2
     4) ENTITY ID2
     5) APPLICATION DATA
```

RECORD-NODE 10

(a) BODY
  1) ENTITY TYPE
  2) ENTITY ID
  3) ADJACENT LOCK NODES
  4) APPLICATION DATA (b) EDGE
  1) ENTITY TYPE 1
  2) ENTITY ID 1
  3) APPLICATION DATA (c) EDGE
  1) ENTITY TYPE 1
  2) ENTITY ID1
  3) APPLICATION DATA (d) EDGE
  1) ENTITY TYPE 1
  2) ENTITY ID1
  3) ENTITY TYPE 2
  4) ENTITY ID2
  5) APPLICATION DATA

RECORD-PAIR 0101·121

(a) BODY
1) TYPE PAIR
2) ID 388
3) RMK F2 PAIR
4) EI NO
5) LK 453

(b) EDGE
1) TYPE 1 CABLE
2) ID1 433
3) RITN DELETOR (c) EDGE
1) TYPE 1 PAIR
2) ID1 391
3) TYPE 2 TERMINAL
4) ID2 211
5) PATH CENT. OFF.

(d) EDGE
1) TYPE 1 TERMINAL
2) ID1 211
3) BUDPST
4) SIDE OUT (e) EDGE
1) TYPE 1 TERMINAL
2) ID1 642
3) COLOR BLUE-GREEN
4) SIDE IN (f) EDGE
1) TYPE 1 TERMINAL
2) ID1 642
3) TYPE 2 LU
4) ID2 105
5) PATH FIELD (g) EDGE
1) TYPE 1 NAME
2) ID1 326
3) EXID 101·121

(h) EDGE
1) TYPE 1 LOOP
2) ID1 232

DATA BASE MANAGER

HYPEREDGE ENTITY-RELATIONSHIP DATA BASE SYSTEMS

TECHNICAL FIELD

This invention relates to computerized data bases and, more particularly, to entity-relationship data bases modeled in hypergraph form.

BACKGROUND OF THE INVENTION

Data bases fall into four general types or classes. A first type, which can be called a hierarchical data base, is modeled on a tree format. Objects, i.e., items of information, in the data base are related to more fundamental items much as leaves are related to branches and branches are related to the trunk tree. This form of data base emphasizes the superior-inferior relationships between data items and is very suitable for data in which such relationships are inherent, e.g., organization charts.

Another type of data base takes on a network form which can be molded as a directed graph. The data items (graph nodes or vertices) in the network are all of equal weight or value and are interconnected by relational properties symbolized by the directed edges of the graph. This form of data base organization is suitable for data items which have multiple hierarchical relationships, e.g., inventory items linked together by common supplier and common warehouse.

A third form of data base is modeled on the relational properties of data items. In such a data base, each relationship is a table with each row listing one of the objects sharing the specific relationship. Virtually all of the information in such a relational data base constitutes the relationships between objects, rather than the objects themselves.

A fourth kind of data base model has been called the entity-relationship model. In this model, which can also be represented by a directed graph, the data entities constitute the vertices of the graph while the directed edges of the graph represent relationships between the entities' nodes. Typically, a data record is a node including both the data item itself and pointers to other data records. The pointers are used to represent the edges of the graph, i.e., the relationships between vertices (data items). Such pointers include an identification of the entity or node pointed to as well as some indication of the nature of the relationship to that other node. Again, the entity-relationship model is suitable for some forms of data in which data entities and relationships between those data entities are inherent in the real world situation being modeled. Some authorities maintain that the entity-relationship model is generic and that the other three models are special cases of the identity-relationship model. The present invention is concerned with the latter type of data base, i.e., entity-relationship data bases. One such data base is described in "An Entity-based Database User Interface" by R. G. G. Cattell, 1980 Proc. ACM-SIGMOD 144, International Conference on Management of Data, Santa Monica, Calif., May 14-16, 1980.

Although single relationships between two objects are common and can be well represented by a directed graph model, some types of relationships inherently involve more than two entities. For example, a relationship such as "parents of" involves a child and two parents. The "parents of" relationship is not fully defined without two (both) parents. Although the relationship between the parent may be simple (e.g., married), such a relationship is not essential to the "parents of" relationship, which involve three persons, father, mother and child. In graph theory, the parenthood edge is called called a hyperedge, since it points simultaneously to more than one vertex. Hypergraphs and hyperedges are discussed in greater detail in a text by C. Berge entitled "Graphs and Hypergraphs", North Holland Company, New York 1973, particularly at pages 389–413.

Since many real world situations involve multiple relationships between data objects, the hypergraph model is eminently suitable for representing data concerning many real world situations. Unfortunately, it has heretofore been difficult or impossible to represent such data bases in a form which is readily processed and efficiently utilized by digital computers.

SUMMARY OF THE INVENTION

In accordance with the illustrative embodiment of the present invention, an entity-relationship data base structure is provided which is easily adapted to the hyperedge model and which provides ease of manipulation, access and utilization of the various data items in the data base. In particular, each data record (called a node) includes a body portion which defines the entity forming the vertex of the directed hypergraph. The data record also includes multiple edge designations by means of which a single relationship (edge) can be used to refer to one, two or more other data entities represented as nodes in the data base system.

This simple approach to data base representations permits automatic searching, identification and utilization of the hyperedges of the directed graph. It also permits processing software to obtain rapid, immediate and direct access to the hyperedge information, and to the multiple nodes pointed to by those hyperedges.

By making such hyperedge information explicit in the data base, the indirection otherwise required for alternative data base representation is avoided, thus making access to this information direct and efficient.

DETAILED DESCRIPTION

Figures 1, 2:
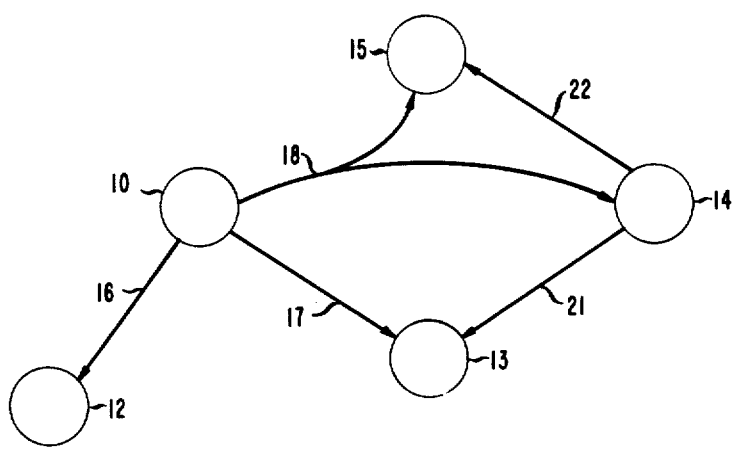
FIG. 1 is an illustrative directed graph showing a hyperedge.
FIG. 2 is a canonical representation of a data base record for one of the nodes of the graph of FIG. 1, showing the canonical hyperedge representation.

Referring more particularly to FIG. 1, there is shown a pictorial representation of a directed hypergraph. A hypergraph is one way of representing certain kinds of entity-relationship data structures.

Such entity-relationship data bases are discussed in "The Entity-Relationship Model—Towards a Unified View of Data," by Peter Chen, *ACM Trans. on Data Base Systems*, Vol. 1 (1976). The circles in FIG. 1 are called "vertices" of the graph and represent the information entities in the data structure. The arrows are called "edges" and represent the relationships between the vertice-entities. The node 10, for example, is connected to node 12 by edge 16. That is, the entity 10 is related to the entity 12 by the relationship 16. The entity 10, for example, may be a piece part in an inventory, entity 12 may be a piece part supplier, and relationship 16 may be a "purchased-by" relationship.

Entity 10 is also related to entity 13 by the relationship 17. Entity 13 may be the warehouse where piece part 10 is being stored. Up to this point entities 10, 12 and 13, and relationships 16 and 17 are well-known in both graph theory and in entity-relationship data bases. The relationship between node 10 and nodes 14 and 15, while well-known in graph theory, have not heretofore been exploited efficiently in entity-relationship data bases.

Entity 10 is related to entities 14 and 15 by the relationship 18. The "edge" 18 of the graph of FIG. 1 is called a "hyperedge" because the edge 18 establishes a relationship from one vertice to between more than two other vertices. The graph including a hyperedge is called a hypergraph. The mathematical properties of such hypergraphs are well-known and are discussed in a text by Claude Berge, *Graphs and Hypergraphs*, North Holland, N.Y. 1973, particularly pages 389-413.

Entity 15 may, in accordance with the previous example, constitute the subassembly of which piece part 10 is a part. Entity 14, on the other hand, may constitute the tool by which part 10 is secured to subassembly 15. In data base structures of the prior art, edge 18 would be represented by two edges, one to vertice 14 and one to vertice 15. The relationship between vertices 10, 14, and 15 would be inferred from these two relationships and relationship 22. The similar relationship of nodes 10, 13 and 14, however, should not infer the "tool used to assemble" relationship since vertice 13 is merely a storage warehouse. Thus the indirection of such a relationship in the prior art systems not only reduces the efficiency and increases the time required to resolve certain kinds of problems in the prior art systems, but also introduces the possibility of erroneous inferences. For example, if a shortage develops in piece part 10, it is desirable to know not only the affected assemblies (15, for instance), but the affected tool that is freed (14, for instance). While this information can be obtained from the prior art data structure with only simple edges, it requires that false relationships be eliminated by adding data to the model.

In addition, changes in relationships are easier to implement with a hypergraph representation. For example, if piece part 10 is no longer a part of assembly 15, the single hyperedge 18 can be erased and no further processing is required.

Such hypergraph representations of data are particularly useful in entity-relationship data bases where relationships in the data base necessarily include more than two entities. As seen above, the parts-assembly-tool is such a situation. The wires connected to electrical terminals on an electric connector is another such relationship. The seats on a particular airline flight is another and the storage blocks on a particular magnetic storage disc is yet another. Each of these situations, and myriads of like situations, would benefit significantly from the hyperedge data representation and processing in accordance with the present invention.

In FIG. 2 there is shown a generalized data base record which might be used to represent a portion of the hypergraph of FIG. 1 and, in particular, node 10. It will be noted that the record for node 10 has one "body" (i.e., the entity 10 itself) and a plurality of "edges," indeed, all of the edges beginning at node 10. Lines (a1) through (a4) identify the body of node 10 both as to "type" (the common name of the piece part, for example) and the specific identification of the particular part (possibly a serial number). The simple edges 16 and 17 are represented at lines b1-b3 and c1-c3, respectively, again including the entity type and the entity identification for each of the nodes connected to node 10 by edges 16 and 17.

The hypergraph 18 is represented in FIG. 2 at lines d1 through d5. The format of the representation is identical to that used for simple edges 16 and 17. The only difference is that more than one connected node is associated with the hyperedge. These nodes are also represented by type and identification information.

The computational simplicity, elegance and power of the hyperedge representation is not immediately apparent and will be elaborated here. In the first place, hyperedges and simple edges look much the same to the accessing programs, making it unnecessary for the data base manager program to know whether or not hyperedges are involved. Only a single set of accessing programs are required which programs are totally indifferent to the edge type. That is, the data base primitives are transparent to the number of nodes pointed to in the data base structure. This means that only the user-supplied application programs need take cognizance of the hyperedges. Since the specific records are also user-specified, it is of considerable value to have the data base manager general enough to handle any and all kinds of edges in the same way. These programs can then be used for many different data base applications.

It should be noted that the example of FIGS. 1 and 2 shows a hyperedge involving only three nodes. It is readily apparent, however, that a hyperedge can involve any number of nodes, so long as that number exceeds two. A simple example of such a hyperedge would be an address, that consists of a house number, a street, a city, a county, a state and a country, each of which might well be a separate node in the hypergraph.

Figure 3:
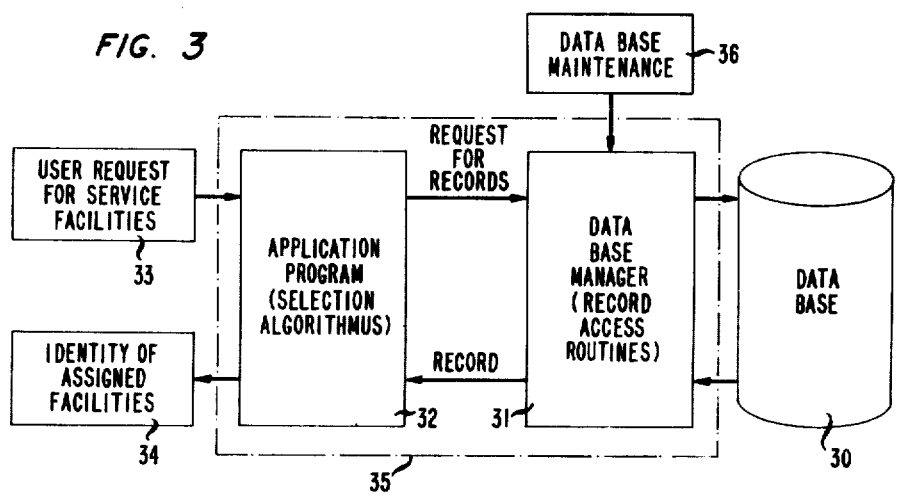
FIG. 3 is a block diagram of one application of a hyperedge data base for the assignment of facilities to users of those facilitates.

Referring more particularly to FIG. 3, there is shown a general block diagram of a data base application in which the hypergraph representation might find use. The information processing system of FIG. 3 comprises a data base 30, illustrated as being contained on a magnetic disc-pack, a data base manager 31, a group of application programs 32, an input device 33 and an output device 34. The data base manager 31 and the application programs 32 are both computer programs, written in source code by programmers, compiled into object code by a compiler program (not shown) and loaded into the internal memory of a general purpose data processor 35.

The input device 33 provides a request to the application programs 32 for service requiring information in the data base 30. Application programs 32 decide what information is required to fill the service request and format a request for specific records or record portions and forward that request to the data base manager 31. The application programs 32 will have been able to ascertain, from the user request, whether or not hyperedge information will be retrieved. The data base manager 31, however, merely retrieves or stores records and record portions without regard to the overall data base architecture. The access to the data base can be summed up as requesting nodes and using the edges of the nodes to navigate through the hypergraph in order to provide the information or service required.

The node access routines of data base manager 31 retrieve the desired information from data base 30 and pass the information as values back to application program 32. In terms of the record structure of FIG. 2, these values will be the entity types, identifications and application data for the body and edges requested from the record (or a portion thereof). These values will then be reformatted by application programs 32 to provide the particular service requested by input device 33. The result will be forwarded to output device 34. If hyperedge values have been retrieved by data base manager 31, application programs 32, already expecting hyperedge information, will appropriately combine and format the multinode hyperedge information in a form necessary to provide the service requested.

While device 33 may be a keyboard and device 34 a display screen in an integral terminal operated by a human user, device 33 may just as well by an automatic electronic or mechanical device (e.g., a parts counter in an assembly line) and device 34 may likewise be an automatic device (e.g., a purchase order generator to reorder inventory parts when levels fall too low). Thus the system of FIG. 3 is a service-providing system rather than simply an information-providing system. The service (inventory control, facilities assignments, ticket preparation, etc.) depends on the availability of the information in data base 30, but goes beyond that information to provide service of some type in the outside world.

The data base 30 is created and maintained in an up-to-date condition by data base maintenance facility 36. Facility 36 also uses the data base manager 31 to access data base 30, but in this case to create and update the records in data base 30. This activity is entirely separate and apart from the utilization of data base 30 by devices 33 and 34 even though the same personnel and possibly the same facilities are used, albeit at different times.

Having explained the present invention in a generalized way in connection with FIGS. 1 through 3, the balance of the figures will be used to explain in detail a particular application of the hypergraph data base representation. This application is the assignment of physical facilities (wires, cables, terminal boxes, etc.) to a telephone subscriber in order to connect that subscriber's telephone to the local telephone central office. While such assignments are maintained for a relatively long period of time, customers do move and facilities must be reassigned. In central offices serving hundreds of thousands of customers, such reassignments of facilities constitute a major, labor-intensive activity. Maximizing the efficiency and minimizing the cost of such reassignments has therefore become an important telephone company activity.

Figure 4:
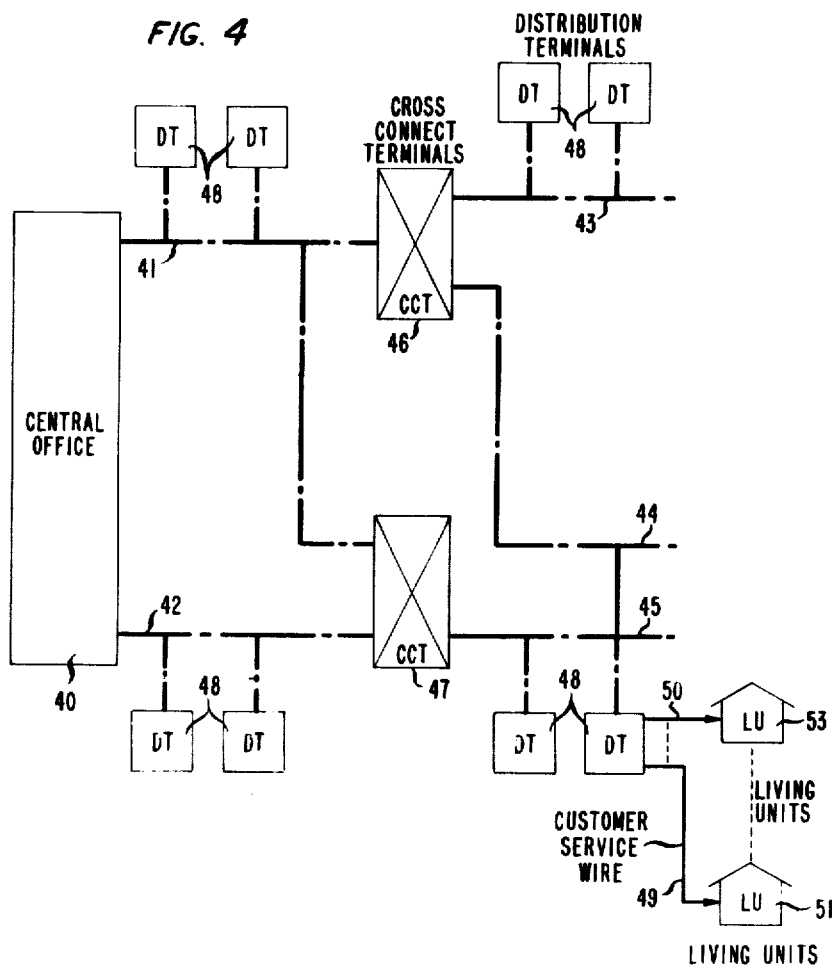
FIG. 4 is a generalized block diagram of the telephone outside plant facilities used in providing telephone service.

Referring then to FIG. 4, there is shown a schematic diagram of typical facilites used to connect a telephone subscriber to the local central office. Since these facilities are all outside of the central office 40, they have been termed "outside plant" facilities. Such outside plant facilities consist of multiconductor cables such as cables 41 through 45, each of which includes a large number of pairs of copper wires twisted together. In general, one such pair is used to provide telephone service to one customer. Cables are identified as to their proximity to the central office, e.g., to f1 cables 41 and 42 and f2 cables 43, 44 and 45, separated by cross connect terminals 46 and 47. Some areas require three or more levels of cable (f3, f4, etc.) in the outside plant interconnection system.

Cross connect terminals 44 and 47 are devices for connecting electrical wire pairs to each other. They have one set of binding posts for connecting wire pairs from the central office (the IN side set) and another set for connecting wire pairs from the other (field) direction (the OUT side set). In addition, cross connect terminals have jumper wires selectively interconnecting selected IN pairs with selected OUT pairs, thereby effectuating the physical interconnection between distribution cables pairs and feeder cable pairs. Cables and pairs have central office ends and field ends.

At selected points along cables 41 through 45 are distribution terminals 48. These distribution terminals also have binding posts for connecting cable pairs to customer service wires such as drop wires 49 and 50 connected to customer living units 51 and 52, respectively. Distribution terminals are typically located at concentrations of subscriber living units and can be located on telephone poles, in pedestals or on customers' premises.

The assignment problem in providing telephone service to the living unit of a telephone subscriber is to assign, in the data base, the necessary wires, terminals, binding posts and customer service wires to create a complete and continuous electrical circuit (a local loop) between the customer's telephone set and the central office. Once the assignment is made in the data base, the corresponding physical connections have to be made out in the field at the time service is to be initiated. The data base must reflect both pending service orders and completed service orders. All facilities are either working or idle and assignments for new customers must be selected from idle facilities. Since rearranging the physical facilities is a very expensive activity, most of the assignment algorithms attempt to minimize the physical rearrangement of plant facilities. For example, facilities assigned to a living unit continue to be so assigned even after a customer has moved. The assumption is that a new customer will soon move in and request service. On the other hand, after some empirically determined time (a few months), the likelihood of the living unit being reoccupied becomes very small and releasing the facilities for use elsewhere is the best tactic.

Figure 5:
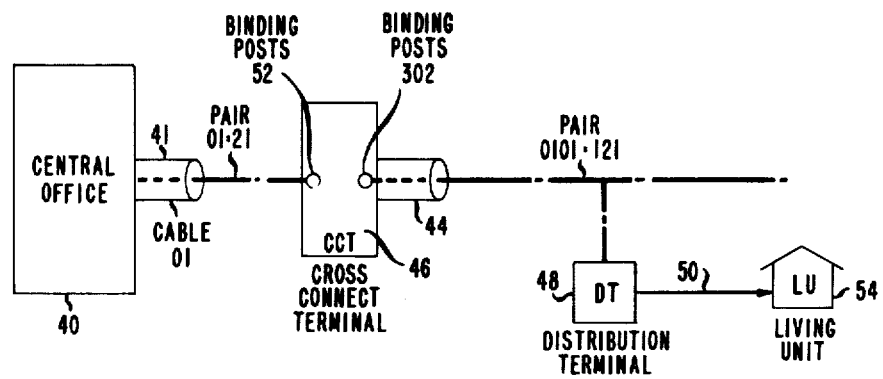
FIG. 5 is a graphical representation of typical outside plant facilities used to provide service to a particular telephone subscriber.

In FIG. 5 there is shown the specific facilities assigned to provide telephone service to living unit 52 in FIG. 4. Thus, cable 41 connecting central office 40 with cross connect terminal 46 is identified as cable "01". The specific pair in cable 01 assigned to living unit 52 is pair "21", best represented by the cable-pair dyad "01:21." The field end of pair 01:21 is connected to binding posts 52 on the IN side of terminal 46. The IN binding posts 52 are cross connected by wire jumpers to OUT binding posts 302. The central office end of the pair 121 of cable 44 (pair 0101:121) is connected to binding posts 302 in terminal 46. At the other (field) end, the pair 0101:121 is connected through distribution terminal 48 to drop wire 50 and thence to living unit 52.

It will be noted that each facility used for this loop has both a type (pair, cable, terminal, etc.), an internal identification, and, optionally, an external identification. For example, some identifications are external e.g., (pair 01:21, terminal 46, binding posts 302, etc.) and some are internal (simple pointers to the node for that facility). The internal identification is used in the sample record of FIG. 2. The generalized problem is to create a data base which serves as an inventory of the facilities and simultaneously facilitates the assignment and reassignment of those facilities into service-providing loops between customers and the central office.

Figure 6:
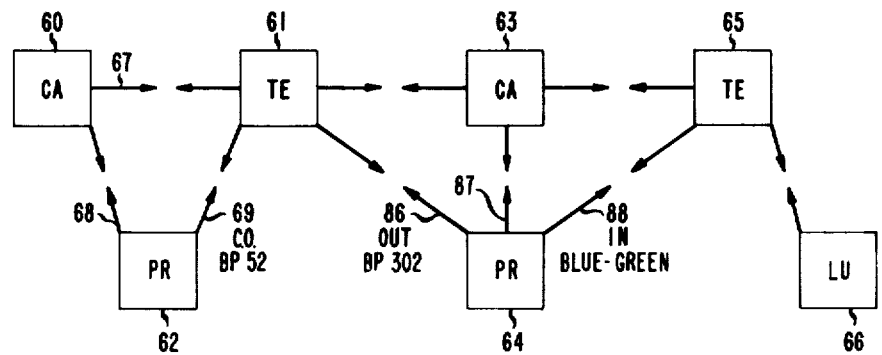
FIG. 6 is the directed graph representation of an inventory of the facilities shown in FIG. 5.

In FIG. 6 there is shown a standard prior art directed graph representing the inventory of facilities making up the outside plant facilities illustrated graphically in FIG. 5. Each box in FIG. 6 is a vertex of the graph and one vertex is provided for each physical entity in the inventory. Thus box 6 is a graph vertex representing cable 41, vertex 61 represents cross connect terminal 46, vertex 62 represents pair 01:21, vertex 63 represents cable 44, vertex 64 represents pair 0101:121, vertex 65 represents distribution terminal 48 and node 66 represents living unit 52. These vertices are the entities in the entity-relationship data base.

The relationships between these entities (the edges of the graph) is represented in FIG. 6 by the directed arrows between the vertices. Thus, arrow 67 represents the relationship "connected to" since cable 41 is connected to terminal 46. Arrow 68 represents the relationship "included in" since pair 01:21 is included in cable 41. Finally, the arrow 69 represents the relationship "connected to" and carries the further information of the side and binding post identification "CO BP 52", i.e., binding posts 52 on the central office (IN) side of terminal 46. The other directed arrows in FIG. 6 have analogous meanings and will not be further discussed here, except to note that the distribution terminal 48 and the living unit 52 have "served by" and "serves" interrelationships and the customer service wire has been left out for simplicity.

Figure 7:
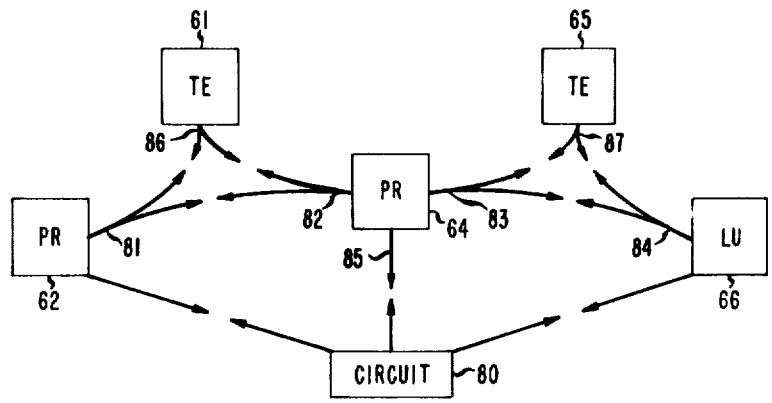
FIG. 7 is a hyperedge representation of the connectivity of the facilites shown in FIG. 5.

The inventory information contained in FIG. 6 is necessary to keep track of the physical facilities used in the loop plant. It is not particularly convenient, however, in assigning an electrical circuit (a loop) to a customer. In FIG. 7 there is shown another set of edges between these same nodes that better serve the loop assignment needs.

In FIG. 7, the same vertices shown in FIG. 6 are repeated (except for the cable vertices) and a circuit vertex 80 has been added. The graph of FIG. 7 can be said to represent the connectivity of the communication circuit as distinguished from the inventory of the parts (FIG. 6). The circuit (named with a telephone number in node 80) is composed of three parts: pair 01:21, pair 0101:121 and living unit 52 (along with drop wire 50). These three parts are connected to each other through terminals. For efficiency of assignment processing, it is desirable to know directly that pair 01:21 is connected to pair 0101:121. At the same time, it is necessary to know that these interconnections take place in terminals and at specific binding posts. Thus, hyperedges 81 and 82 are used to simultaneously point to the connected pair and the terminal through which this connection is effected. The representation of FIG. 6 in which the pair-to-pair connection could be discovered by further searching in the data base is very inefficient for assigning facilities.

The interconnections of pair 0101:121 (box 64) and living unit 52 (box 66) is likewise represented by two hyperedges 83 and 84, serving the same function for this part of the circuit. It should be noted that a rearrangement of the jumper wires could reassign the physical facilities to other circuits without changing the inventory. That is, the connectivity of FIG. 7 could change without changing the inventory of FIG. 6.

The hyperedge of FIG. 7 serves to maintain an inventory of assigned electrical circuits while that of FIG. 6 maintains an inventory of physical parts. Both are necessary to adequately service the telephone subscribers.

Figures 8, 9:
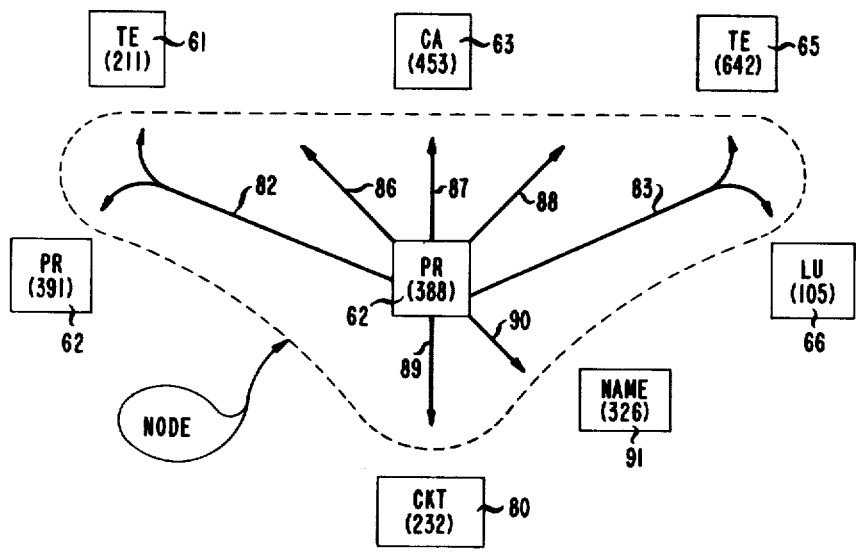
FIG. 8 is a complete graphical representation of one node of the hypergraph of FIG. 7.
FIG. 9 is a typical data base record for the node of FIG. 8, illustrating the hyperedge representation.

In FIG. 8 there is shown a graphical representation of one node of the hypergraph data base used to represent both the physical facilities and the circuit assignment illustrated in FIG. 4. The node represented in FIG. 8 is that representing pair 101:121. As previously noted, the node includes a body entity portion (box 62) and a plurality of edges 82, 83, 86, 87, 88 and 89, some of which (82 and 83) are hyperedges. The node illustrated in FIG. 8 contains all of the information about pair 0101:121 that is in the data base. It will be noted that the "name" of this pair by which it is known in the outside world (pair 101:121) is a separate entity 91 pointed to by edge 90. The internal identification of each node is by way of an invariant internal pointer which permits direct access to the associated record. Moreover, the external name of an entity can change without changing a single one of the internal references thereto.

In FIG. 9 there is shown a representation of the record in the data base for pair 0101:121, using the conventions established in FIG. 2. The body portion of the record appears first, but the edges are ordered haphazardly. A specific edge must be searched for in this arrangement. The contents of the data record of FIG. 9 will now be taken up.

It will be first noted that each physical facility is identified with an internal identification number different from the name by which it is known in the external world. These internal identification numbers are pointers to the identified node and simplify the computer record-keeping, permitting arbitrary and changeable names in the outside world. A special edge 90 points to the external identification 91 ("pair 0101:121,") as shown in FIG. 8, and at lines g1-g3 in FIG. 9.

Edges at lines c1-c5 and f1-f5 are hyperedges, each including two node identifications. Each body or edge has one or more lines of so-called "application data," i.e., information useful in applying the data base information to a problem in the outside world. For example, at line c-5, the edge specifies that the pair is connected to binding posts on the central office side of the terminal (as distinguished from the "field" side of the terminal). At line e-3 and e-4g the pair is specified as being connected to the "blue-green" stub wires on the "IN" side of the distribution terminal (as distinguished from "OUT" side). The edge n specifies the loop circuit of which this pair is a part.

Figure 10:
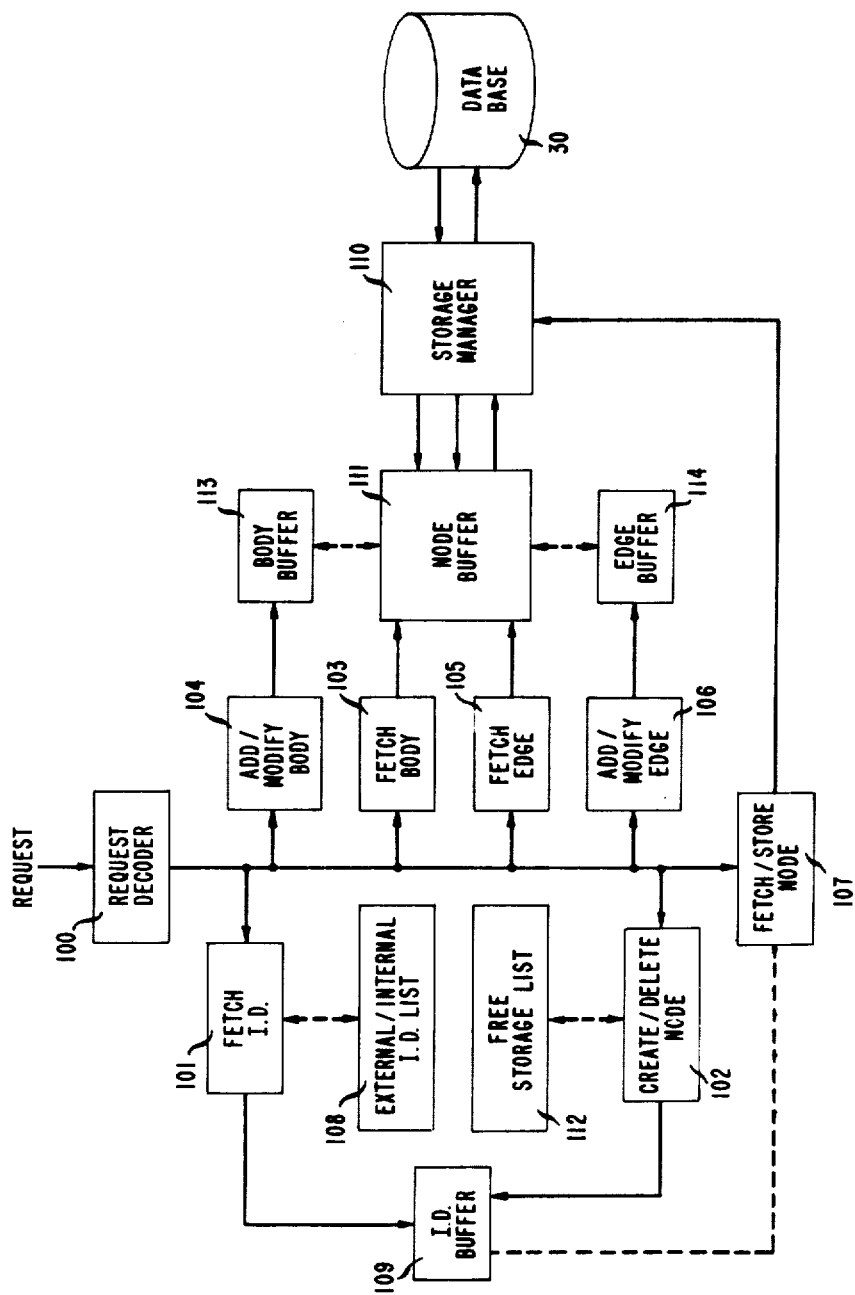
FIG. 10 is a schematic block diagram of the data base manager shown in FIG. 3.

In FIG. 10, there is shown a general block diagram of the data base manager 31 of FIG. 3. This data base manager is, of course, implemented by computer programs and hence the block diagram merely illustrates the interaction of the various software modules. In FIG.

10, requests for additions, deletions or modifications to the data base 30 are received by a request decoder 100. Decoder 100 decomposes the requests (parses the request command) to enable any one of seven specific procedures 101 through 107.

Procedure 101 is used to obtain the internal identification number (e.g., ID 388 for node 62 in FIG. 8), given the external identification (e.g., pair 0101:121 for node 62 in FIG. 8). In order to accomplish this translation, a look-up table 108, called the external/internal ID list, is maintained. The internal ID is then stored in buffer 109 for future use. Using this internal ID number, fetch node procedure 107 can then direct storage manager 110 to obtain the proper node data from data base 30. If, for example, data base 30 resides on magnetic discs, storage manager 110 contains the necessary circuitry to locate and access the necessary tracks in the proper sector on the appropriate one of the discs. Data base 30 may reside in other forms of storage, however, such as magnetic cores, magnetic tapes, magnetic bubbles, video or laser storage elements and so forth. In any event, storage manager 110 includes all of the necessary circuitry to recover a data record, given the unique internal ID for that record. Since such data retrieval operations are well-known in the art, they will not be further described here.

The data record obtained by storage manager 110 is stored in node buffer 111, where it is available for further processing. It should be noted that buffers 109 and 111, as well as the other buffers in FIG. 10 are merely storage locations in the computer memory reserved for the storage of the data items described. Similarly, list 108 is also merely a plurality of contiguous reserved storage locations containing the information described above.

Nodes can be created or deleted using procedure 102. Procedure 102, in response to decoder 100 obtains the addresses of unused storage space from free storage list 112, assigns an internal ID number to the storage block and puts this ID number in buffer 109. The contents of the new node can then be generated using the facilities to be described below.

Conversely, nodes which are no longer needed (e.g., where facilities have been destroyed or withdrawn from use) can be deleted from the data base by removing the appropriate entry from list 108 and adding the corresponding storage space to free storage list 112. The actual data in data base 30 need not be immediately deleted, by may be overwritten when this storage space is reassigned to a new node being created.

Once the node information is in node buffer 111, the body or a particular edge of the node may be fetched by procedures 103 and 105, respectively. The body data is then stored in buffer 113 where it may be modified by procedure 104. A newly created node may have the body data inserted in body buffer 113 by the same procedure 104. Similarly, the edge data is stored in edge buffer 114 in response to a fetch edge request by procedure 105 and is there available for addition, modification or deletion by procedure 106. New nodes are created by systematically securing an ID number and reserving storage space (procedure 102), creating the body (procedure 104) and creating the edges, one at a time (procedure 106). Once a node has been created or modified, it can be replaced in data base 30 by procedure 107, which causes storage manager 110 to move the data from node buffer 111 to data base 30. Meanwhile, the data stored in buffers 109, 111, 113 and 114 is available for processing by other procedures in the application programs 32 of FIG. 3.

It can be seen that the data base manager of FIG. 10 is completely transparent to the hyperedges of the present invention. Such hyperedges are, of course, stored in edge buffer 114 when retrieved and are hence available for processing. So far as the data base manager of FIG. 10 is concerned, however, these hyperedges are simply edge data handled exactly the same way as simple (non-hyper) edges. It is the application programs 32 which know about and expect the hyperedge data and which provide the facilities for using the hyperedge data.

An example of the operation of the system of FIG. 10, the following Table I shows the pseudocode necessary to add a new edge to a node, assuming that the new edge information has been placed in edge buffer 114. The routine "addedge" first checks to see if the edge already exists in the node. If it is, a message is returned indicating that the edge already exists. If the edge does not already exist, it is added to the node and a message to that effect is returned.

TABLE I

| Program to Add an Edge to a Node |
| --- |
| addedge (node,edgebfr) |
| /* Add the edge in buffer edgebfr to the node */ |
| If node has edge = edgebfr; |
| then return "exists"; |
| Else add edgebfr to node; |
| Then return "added"; |
| end |

In Table II there is shown the pseudocode for a program "relate₁₃node₁₃node" to create hyperedges from two nodes to the other node and a third node, using the "addedge" routine of Table I.

TABLE II

| Program to Create Hyperedges | | |
| --- | --- | --- |
| relate__node__node(node__A, edgebfr__A, node__B, edgebfr__B, node__C) | | |
| /* | Create one hyperedge from node A to | */ |
| /* | nodes B and C, and | */ |
| /* | Create a second hyperedge from node B | */ |
| /* | to nodes A and C, | */ |
| /* | using the edges in the edge buffers. | */ |
| | Set rid(A) and rid(C) in edgebfr__B; | |
| | Set rtype(A) and rtype(C) in edgebfr__B; | |
| | Set rid(B) and rid(C) in edgebfr__A; | |
| | Set rtype(B) and rtype(C) in edgebfr__A; | |
| /* | Try to add edges to rodes A and B | */ |
| | if addedge(node__A, edgebfr__A) and | |
| | addedge(node__B, edgebfr__b) | |
| | return same message; | |
| | then return that message; | |
| /* | Otherwise the messages are different | */ |
| /* | and there is an error | */ |
| | else return "error"; | |

Finally, Table III is an application program which uses the "relate₁₃node₁₃node₁₃" to indicate in the data base records the connection of two pairs to each other, useful in assigning facilities in the data base.

TABLE III

| Cross-Connect Pairs | | |
| --- | --- | --- |
| /* | This is an application program to | */ |
| /* | connect "pair__A" | */ |
| /* | to "pair__B" in Terminal "ter" | */ |
| | node__A = read(pair__A); | |
| | node__B = read(pair__B); | |
| | node__C = read(ter); | |
| /* | Add application data__A and data__B | */ |

TABLE III-continued

```
                    Cross-Connect Pairs
/*         (pair color,binding post, etc.)       */
/*                   to buffers.                  */
              add data_A to edgebfr_A;
              add data_B to edgebfr_B;
          message = relate_node_node(node_A,
                       edgebfr_A, node_B,
                       edgebfr_B, node_C);
                     if message = "error",
                  print("cannot cross-connect",
                       pair_A, "and", pair_B,
                         "in terminal", ter);
                              end;
```

What is claimed is:

1. A data base system comprising
a data base comprising a plurality of records each including a body portion and a plurality of edge portions for storing signals,
at least one of said edge portions including pointer signals to a plurality of other records, and
means for accessing and utilizing the signals stored in said records.

2. The data base system according to claim 1 wherein each of said portions includes stored signals representing an entity type and an entity identification and entity application.

3. The data base system according to claim 1 further comprising data base manager programs for accessing, creating, deleting and modifying said records.

4. The data base system according to claim 1 further comprising a plurality of user programs for utilizing the signals stored in said records.

5. The data base system according to claim 4 wherein said user programs include means for selectively assigning resources identified in said nodes to resource utilization means.

6. In a data base having a plurality of records of similar format,
means for storing signals in said records representing information identifying each of a plurality of assignable facilities,
means for storing signals in said records representing each of a plurality of relationships between any two of said facilities,
means for storing signals in said records representing at least one relationship between three or more of said facilities, and
means for accessing, modifying and utilizing said records.

7. The combination according to claim 6 wherein said facilities comprise telephone outside plant equipment, and
said utilization means comprises means for assigning said equipment to telephone subscribers.

8. The combination according to claim 6 wherein said record format represents each entry in an entity-relationship data base.

9. In data base system wherein each record comprises a node including a body portion and a plurality of edge portions,
means for storing signals representing the identification and attributes of a physical facility in each said head portions of said nodes,
means for storing edge signals representing simple edges to one other node in some of said edge portions of said record,
means for storing hyperedge signals representing hyperedges to more than one other of said nodes in other of said edge portions of said record, and
means for accessing and utilizing said records to assign said physical facilites to utilizers of said facilities.

10. The combination according to claim 9 wherein said physical facilities comprises telephone outside plant equipment.

* * * * *